United States Patent [19]

Connor

[11] 3,920,889

[45] Nov. 18, 1975

[54] METHOD AND APPARATUS FOR CRISPENING VIDEO SIGNALS BY THE USE OF TEMPORAL FILTERS

[75] Inventor: Denis John Connor, Kanata, Canada

[73] Assignee: Bell Telephone Laboratories, Incorporated, Murray Hill, N.J.

[22] Filed: Dec. 5, 1974

[21] Appl. No.: 529,821

[52] U.S. Cl. .......................... 178/6.8; 178/DIG. 34

[51] Int. Cl.² .......................... H04N 5/21

[58] Field of Search .......................... 178/6.8, DIG. 34

[56] References Cited

UNITED STATES PATENTS

| | | | |
|---|---|---|---|
| 3,571,505 | 3/1971 | Mounts | 178/6.8 |
| 3,800,077 | 3/1974 | Smith | 178/6.8 |

OTHER PUBLICATIONS

Goldmark et al., "A New Technique for Improving the Sharpness of Television Pictures," Journal SMPTE, Vol. 57, Oct. 1951, pp. 382–396.

*Primary Examiner*—Howard W. Britton
*Attorney, Agent, or Firm*—Bryan W. Sheffield

[57] ABSTRACT

The contrast at the edges of moving objects in a television picture is enhanced by the novel technique of averaging a past and a future video frame, subtracting the averaged frame from the current frame to generate a second derivative video signal and then adding an attenuated version of the second derivative video signal to the current frame to generate a video signal having more clearly defined moving edges. Advantageously, the incoming video signal is first digitalized thus permitting the use of a digital memory as the frame-store.

17 Claims, 6 Drawing Figures

METHOD AND APPARATUS FOR CRISPENING VIDEO SIGNALS BY THE USE OF TEMPORAL FILTERS

BACKGROUND OF THE INVENTION

1. Field of the Invention

Broadly speaking, this invention relates to the processing of video signals, or the like. More particularly, in a preferred embodiment, this invention relates to methods and apparatus for enhancing the definition of moving edges in a television picture.

2. Discussion of the Prior Art

As is well known, the definition of a television picture, as perceived by a viewer, is determined by the scanning standards employed to generate the picture as well as the bandwidth of any amplifiers and transmission facilities through which the signal passes on its way to the receiver. Typically, the transmission facility is the limiting factor and often results in a received picture which contains considerably less picture detail than is theoretically available at the transmitter. For example, the 525 line, 60 fields/second television standard approved by the FCC for commercial broadcasting in this country contains picture components up to about 4.2 MHz in frequency. However, the video signal ultimately received by the viewer seldom contains picture information much above 3 MHz. Because these higher video frequencies represent abrupt changes in picture contrast, for example, at the edges of vertically oriented objects in the picture, the attenuation of these higher frequency signal components at the receiver causes the viewer to perceive the edges as smeared or fuzzy.

From time to time, various techniques have been proposed to enhance or "crispen" such a smeared picture; see, for example, the article by Goldmark and Hollywood entitled "A New Technique for Improving the Sharpness of Television Pictures," in Volume 57, *Journal S.M.P.T.E.*, October, 1951, pages 382–396. The "crispening" technique proposed by Goldmark relies on the use of non-linear circuitry to decrease the apparent rise-time of an isolated step input which has been applied to a bandwidth limited system. The edges in the received picture appear sharper or more clearly defined by the use of Goldmark's technique. More particularly, Goldmark employs a non-linear circuit to reform the roughly triangular differential of the step signal into a narrow spike, also roughly triangular in shape, which is superimposed on the original waveform to obtain a response corresponding to about half the original rise-time.

One skilled in the art will appreciate that the "crispening" technique proposed by Goldmark operates on a line-by-line basis and is directed to the overall picture definition and is not specifically addressed to the problem of moving objects in the television field. However, due to the integrating action of the picture tube in a television camera, or to prior low-pass temporal filtering which may have occurred, for example, in the conditional replenishment coding scheme disclosed in U.S. Pat. No. 3,571,505, which issued Mar. 16, 1971 to F. W. Mounts, the edges of moving objects may be smeared to a far greater extent than the edges of stationary objects and under certain circumstances if the smearing is excessive, it becomes objectionable and steps must be taken to reduce or eliminate it.

SUMMARY OF THE INVENTION

The problem, then, is to devise methods and apparatus for enhancing the definition of the moving edges in a television picture without a corresponding change in the definition of stationary edges. This problem has been solved in the instant invention which comprises temporarily storing successive frames in the video signal to furnish, at any instant of time, information concerning present, past and future video frames, averaging a past and a future video frame, subtracting the averaged video frame from the present video frame to generate a second derivative video signal, and then adding the second derivative video signal to the present frame to generate a video signal in which higher temporal frequencies, and hence the definition of the edges of moving objects, is enhanced. To practice the above method, one illustrative apparatus embodiment comprises means for storing at least two complete frames of the video signal to furnish, at any instant of time, information concerning present, past and future video frames, a first adding circuit connected to the input and output of the storing means to average a past and a future video frame, a subtracting circuit connected to the storing means and to the output of the adding circuit to subtract the averaged video frame from the present video frame to generate a second derivative video signal, and a second adding circuit connected to the storing means and to the output of the subtracting circuit to add the present video frame to the second derivative signal thereby to generate a video signal in which the definition of the edges of moving objects is enhanced.

The invention and its mode of operation will be more fully understood from the following detailed description when read with the attached drawings, in which:

DETAILED DESCRIPTION OF THE INVENTION

Figure 1:
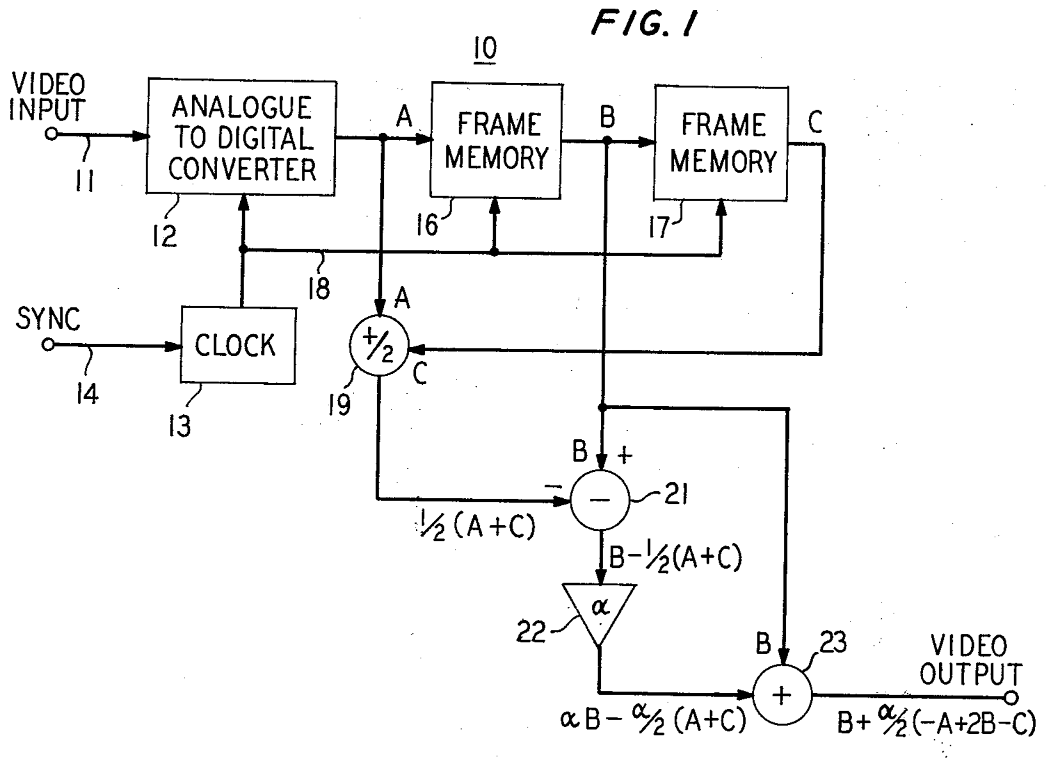
FIG. 1 is a block schematic diagram of an illustrative, linear, temporal filter according to the invention.

FIG. 1 depicts in block diagram form an illustrative temporal filter 10, according to the invention. As shown, the video signal to be processed is applied, via a lead 11, to the input of an analogue-to-digital converter 12. Converter 12, in turn, is connected to the output of a clock circuit 13 which is synchronized with the incoming video signal by means of sync pulses applied thereto via a lead 14. Converter 12, which advantageously has at least an 8-bit resolution, periodically samples the video input signal and generates an 8-bit digital word for each such video sample.

The output from converter 12 is fed to the input of a first frame-memory 16 which has sufficient memory capacity to store the digital samples corresponding to one entire video frame. The output of frame-memory 16 is connected to the input of a second frame-memory 17 which is also capable of storing an entire video frame. Both frame-memory 16 and frame-memory 17 are connected to, and synchronized with, clock 13 via a lead 18. Frame-memories 16 and 17 may advantageously comprise any device which is capable of storing large numbers of 8-bit digital words, for example, a conventional core memory or any of the newer memories such as those employing magnetic bubbles, CCD devices, etc.

The input to frame-memory 16 and the output of frame-memory 17 are connected to a digital adding circuit 19, the output of which is connected to the − input of a digital subtracting circuit 21. The output of frame-memory 16 is connected to the + input of subtractor 21, and the output of frame-memory 16 is connected to the input of a buffer-amplifier 22. Amplifier 22 has a gain of $\alpha$, where $\alpha$ may be less than unity and the output of amplifier 22 is connected to one input of a second adding circuit 23, the other input of which is directly connected to the output of frame-memory 16. The output of the temporal filter is taken from the output of adder 23. As will be explained below, the filter just described is more properly referred to as a linear, second derivative, temporal filter.

In operation, during the first frame of the video signal, frame-memory 16 successively stores the digital samples generated by converter 12. At the end of the first frame, frame-memory 16 is filled and the digital samples of the first frame are transferred, seriatim, from memory 16 to memory 17 to make room for the incoming samples from corresponding sampling positions in the second frame. This process is reiterated for the third and all subsequent frames. Thus, after a short start-up period comprising only two frame intervals, filter 10 has access to the current video frame, the immediate past video frame, and the immediate future video frame. For convenience, these are respectively designated as frames B, C and A. Using this notation, the input to adder 19 comprises frame A and frame C and the output thereof, $\frac{1}{2}(A + C)$, represents the mean or average value of the immediate past and the immediate future frames. This average value is subtracted from the current frame B in subtractor 21 yielding a scaled, second derivative video signal, $B - \frac{1}{2}(A + C)$. Physically, this second derivative signal represents frame-to-frame differences between the current frame and the average of the immediate past and immediate future frames.

The second derivative video signal, $B - \frac{1}{2}(A + C)$, is next multiplied by a factor of $\alpha$ in amplifier 22 whose output becomes $\alpha B - \alpha/2\ (A + C)$. This output is next added to the current frame B in adder 23 thereby to generate the video signal, $B + \alpha/2\ (-A + 2B - C)$ in which the temporal frequency components have been enhanced. It should not be forgotten that the video frames are stored in the frame-memories in digital form and that the signal manipulations discussed above actually take place on a sample-by-sample or word-by-word basis. However, the overall result is the same as if the signals were processed in analogue form.

Figure 2:
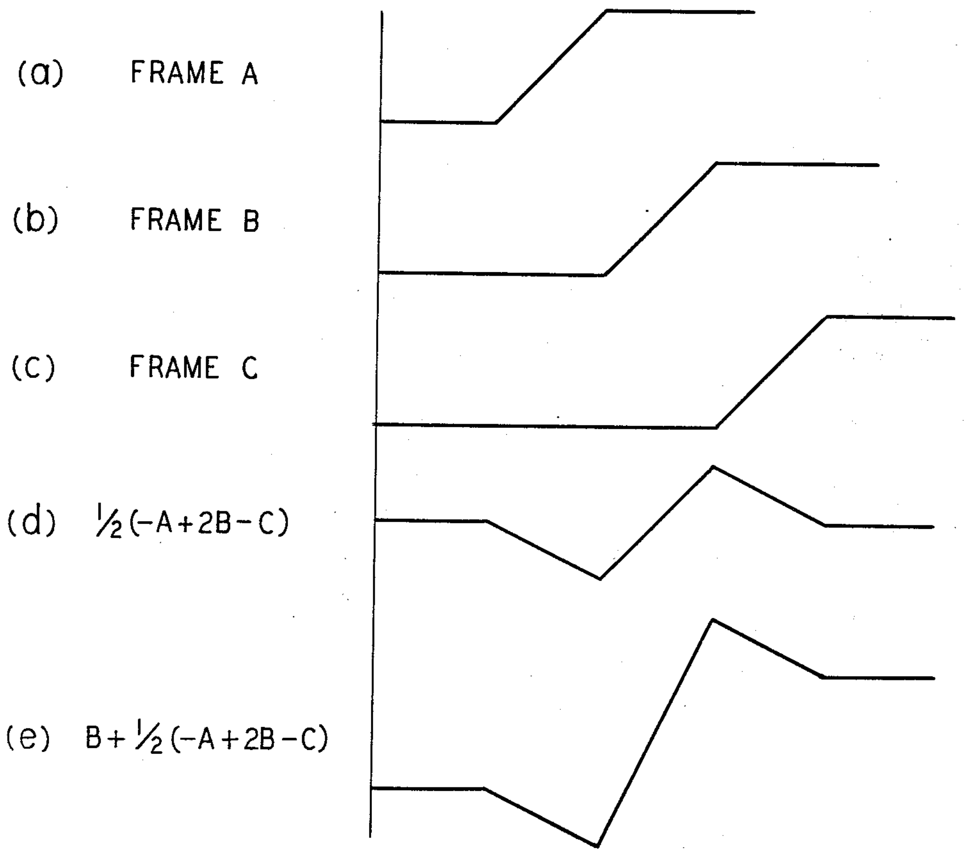
FIG. 2 is a graph showing the waveforms which are present at various locations in the filter shown in FIG. 1.

FIG. 2 shows the effect that filter 10 has upon the edges of a moving object in the video frame and illustrates how the signal manipulations discussed above act to "crispen" the image seen by a viewer. Waveform *a* represents the shape of the wave that is expected for a moving edge that has been integrated over one frame interval. Waveforms *b* and *c* represent the same waveform delayed by one and two frame intervals, respectively. Waveform *d* represents the second derivative video signal present at the output of subtractor 21, and waveform *e* represents the video signal enhanced by the second derivative signal at the output of adder 23. It will be apparent from the drawing that the slope of waveform *e*, and hence the contrast of the moving edge, is considerably greater than the slope of waveform *b*. It will also be noted that waveform *e* is accompanied by a certain degree of overshoot and undershoot, in much the same fashion as occurs in prior art second derivative "crispening" along a scanning line.

Now, if the video signal to be "crispened" contains any noise having high temporal frequency components, the linear filter shown in FIG. 1 will tend to enhance this noise. This will frequently result in a picture which is less pleasing to the viewer than the blurred but noise-free picture would be. As a solution to this added problem, FIG. 3 depicts an alternative embodiment of the invention which does not exhibit the same tendency to noise enhancement as does the linear filter of FIG. 1.

Figure 3:
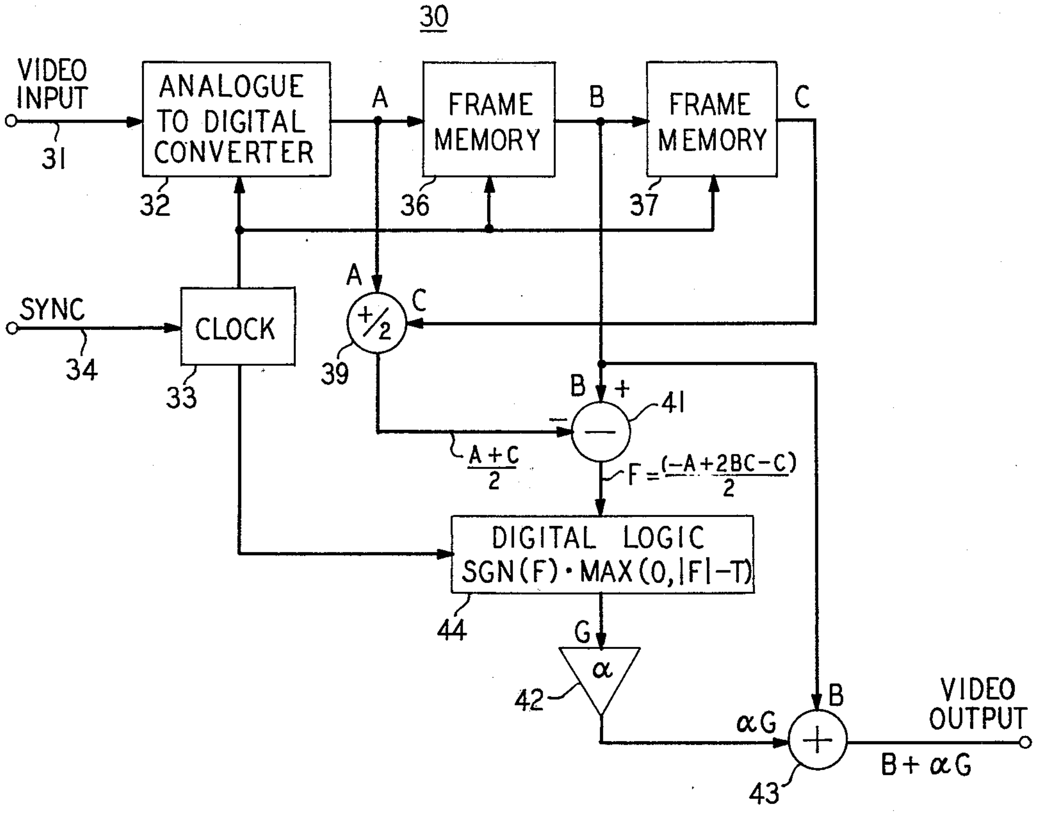
FIG. 3 is a block schematic diagram of another embodiment of the invention which comprises a non-linear, temporal filter.

As shown in FIG. 3, non-linear temporal filter 30 is similar in design and construction to the linear temporal filter discussed with regard to FIG. 1. More specifically, filter 30 comprises an analogue-to-digital filter 32, a pair of frame-memories 36 and 37, an adding circuit 39, a clock circuit 33, a subtracting circuit 41, a buffer-amplifier 42, and a second adding circuit 43, all of which perform identically as described above for FIG. 1. Filter 30 differs from filter 10, however, in that a digital logic circuit 44 is interposed between subtracting circuit 41 and the input to buffer-amplifier 42. Logic circuit 44 performs a mathematical operation on the first derivative video signal F applied thereto from subtractor 41. This operation may be designated as $\{SGN(F) \cdot MAX(0, |F| - T)\}$, that is to say, logic circuit 44 compresses the incoming second derivative video signal, $$F = \frac{(-A + 2B - C)}{2}$$

by first rectifying it, then shifting it down by an amount $T$, clipping it at 0, and then restoring the sign of the original second derivative signal. The digital circuitry required to perform this rectification, clipping, and clamping is entirely conventional and is not given in detail.

After logic circuit 44 has performed the signal manipulations above described, the output, referred to as G, is amplified in buffer-amplifier 22 and added to the current frame, B, to produce the output signal $B + \alpha G$, where $G = \{SGN(F) \cdot MAX(0, |F| - T)\}$ and $$F = \frac{(-A + 2B - C)}{2}$$

Figure 4:
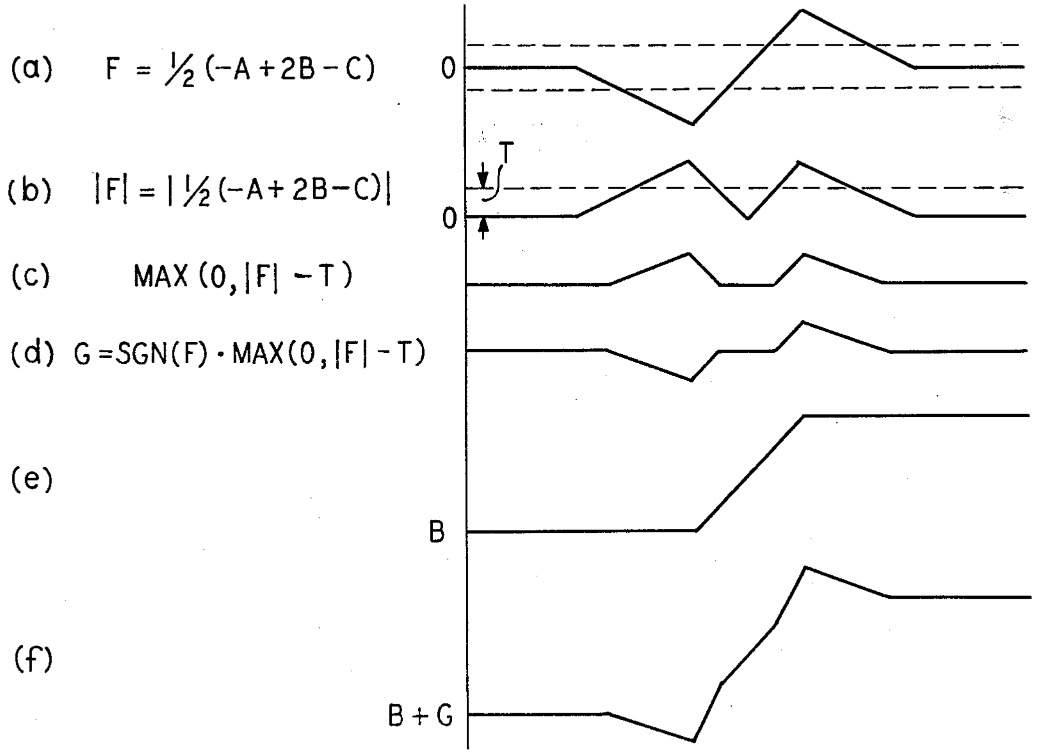
FIG. 4 is a graph showing the waveforms which are present at various locations in the filter shown in FIG. 3.

FIG. 4 shows the effect that temporal filter 30 has upon the edges of a moving object in the video frame and illustrates how the signal manipulations discussed above "crispen" the image seen by a viewer, without at the same time enhancing any noise which may be present in the video signal. Waveform *a* in FIG. 4 is identical with waveform *d* in FIG. 2 and represents the second derivative video signal of a moving edge that has been integrated over one frame interval, e.g., as shown in waveforms *a* and *c* of FIG. 2. Returning to FIG. 4, waveform *b* represents the second derivative video signal after it has been rectified and shifted downwardly through the threshold T. Waveform *c* represents waveform *b* after clipping at the zero level, and waveform *d* represents waveform *c* after the sign of the original second derivative signal (waveform *a*) has been restored. Waveform *e* shows the current frame, B, and waveform *f* depicts the second video derivative signal; that is the summation of waveforms *d* and *e*.

It will be noted that the slope of waveform *f*, and hence the contrast of moving edges in frame B, is greater than the slope of waveform *e*. A certain degree of overshoot and undershoot will also be noted in waveform *f*, however, by center-clipping the second derivative video signal, the enhancement of low amplitude noise is eliminated in stationary areas of the picture, although it may still appear on moving edges.

Figure 5A:
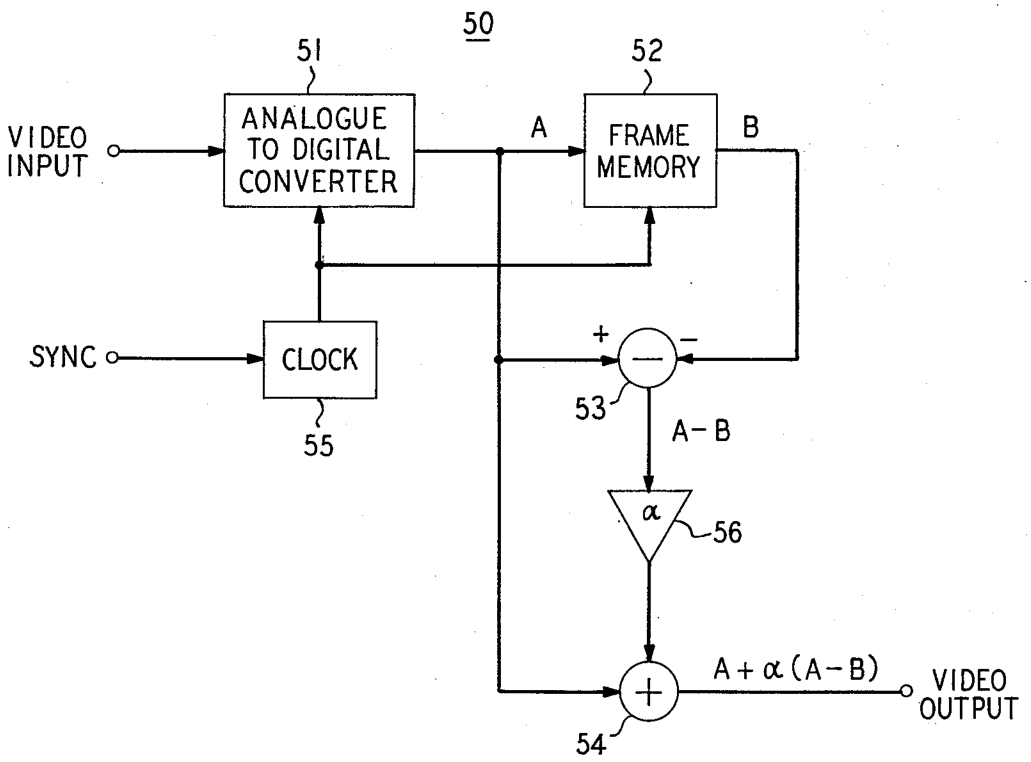
FIGS. 5*a* and 5*b* depict two further embodiments of the invention which respectively comprise a video preemphasis and de-emphasis circuit, both using linear, temporal filters.
Figure 5B:
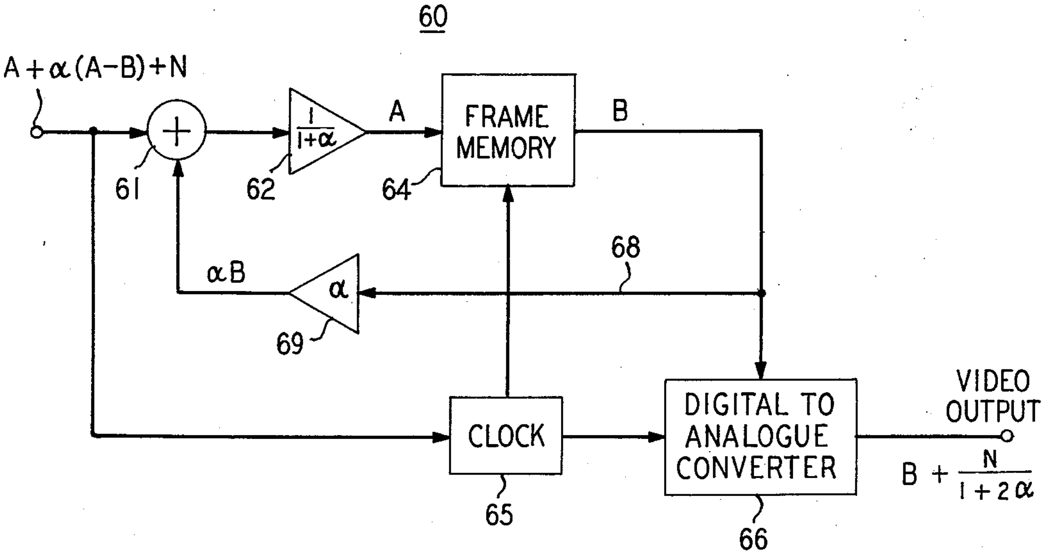

FIG. 5*a* depicts yet another embodiment of the invention in which temporal filtering is employed to pre-emphasize a video signal prior to transmission of the signal over a noisy transmission facility. FIG. 5*b* depicts the corresponding circuit which is employed to de-emphasize the signal at the receiving location. As shown in FIG. 5*a*, pre-emphasis circuit 50 comprises an analogue-to-digital converter 51 which is connected to a frame-memory 52, to the + input of a subtracting circuit 53, and to one input of an adding circuit 54. The output of frame-memory 52 is connected to the − input of subtracting circuit 53, and the output of subtracting circuit 53 is connected to a buffer-amplifier 56 having a gain of $\alpha$, thence to another input of adding circuit 54. A clock circuit 55 receives synchronizing pulses for the video input signal and synchronizes converter 51 and frame-memory 52. The output of pre-emphasis circuit 50 is taken from the output of adding circuit 54 and is assumed to be connected to a band-limited transmission facility which adds a noise factor of N to the transmitted signal.

In operation, frame-memory 52 makes available the current video frame A and the immediate past video frame B. The output of subtracting circuit 53 is A − B, the frame-to-frame difference signal. After multiplication by a factor of $\alpha$, this first derivative video signal is combined with the current frame A to produce the pre-emphasized output signal $A + \alpha (A - B)$, which signal is then transmitted over the noise-generating transmission facility. Thus, preemphasis circuit 50 emphasizes the higher temporal frequencies in the video signal, i.e., the frequencies that are associated with areas that are changing from frame-to-frame, and transmits these higher temporal frequencies at a level which, of necessity, is greater than would otherwise be the case if signal A were transmitted in unaltered form.

As shown in FIG. 5*b*, de-emphasis circuit 60 comprises an adding circuit 61, one input of which receives the incoming video signal from the transmission facility, and the output of which is connected to an attenuation circuit 62 having a gain of $1/1 + \alpha$. The output of attenuating circuit 62 is connected to a frame-memory 64, and the output of frame-memory 64 is connected to a digital-to-analogue converter 66. The output of converter 66 comprises the de-emphasized video signal which is fed to some suitable receiving device (not shown). A feedback loop 68, including an amplifier 69 having a gain of $\alpha$, connects the output of frame-memory 66 back to another input of adding circuit 61. A clock circuit 65 is connected to the input of adding circuit 61 and to memory 64 and converter 66.

If the input to frame-memory 64 is designated as A and the output thereof is designated B, then it is clear by computing the gain around the feedback loop that, provided the noise factor N which is added to the pre-emphasized signal during the transmission process is not synchronized with the picture, as will generally be the case, the lower level of the noise in the received picture will be attenuated by a factor of $1/1 + \alpha$ at the output of converter 66. Selection of the appropriate value for $\alpha$ in the pre-emphasis circuit shown in FIG. 5*a* involves consideration of various transmission system constraints, such as the peak power which may be applied to the transmission facility; etc.

The above-described embodiments of the invention have been illustrated with reference to digitalized video signals. One skilled in the art will appreciate, however, that the invention is not so limited and may be employed with equal facility with conventional, analogue video signals. In that event, it would be necessary to replace each digital frame-memory with an analogue frame-memory, for example, a rotating magnetic disc, which must also be capable of storing an entire video frame. These magnetic video recording discs are well within the state of the art and are commercially available. It would, of course, also be necessary to perform analogue additions, subtractions and multiplications rather than digital. Further, while the invention has been described with reference to television systems, it will be apparent that it has equal applicability to facsimile, slow-scan television, video telephone service, etc.

One skilled in the art may also make various changes and modifications to the layout of parts shown, without departing from the spirit and scope of the invention.

What is claimed is:

1. A method of enhancing the definition of the edges of moving objects in a video signal, or the like, which comprises the steps of:

temporarily storing successive frames of said video signal to furnish, at any instant of time, information concerning present, past and future video frames;

averaging a past and a future video frame;

subtracting said averaged frame from the present frame to generate a second derivative video signal; and then, adding said second derivative video signal to the present video frame to thereby generate a video signal in which the higher temporal frequencies, and hence the definition of the edges of moving objects in said signal, are enhanced.

2. The method according to claim 1 comprising the further steps of amplifying said first derivative video signal, prior to adding said first derivative video signal to the present video frame.

3. A method of enhancing the definition of the edges of moving objects in a video signal, or the like, which comprises the steps of:

temporarily storing successive frames of said video signal to furnish, at any instant of time, information concerning present, past and future video frames;

averaging a past and a future video frame;

subtracting said averaged frame from the present video frame to generate a second derivative video signal;

processing said second derivative video signal according to the mathematical relationship {SGN ($F$) · MAX (0, $|F| - T$)}, where $F$ represents said second derivative video signal and $T$ represents some threshold level; and then, adding said processed second derivative video signal to the present video frame thereby generating a video signal in which higher temporal frequencies, and hence the definition of the edges of moving objects in the video signal, are enhanced.

4. The method according to claim 3 comprising the further step of amplifying said processed first derivative video signal prior to its addition to the present video frame.

5. Apparatus for enhancing the definition of the edges of moving objects in a video signal, or the like, which comprises:

means for storing at least two complete frames of said video signal to furnish, at any instant of time, information concerning present, past and future video frames;

a first adding circuit connected to the input and output of said storing means thereby to average a past and a future video frame;

a subtracting circuit connected to said storing means and to the output of said adding circuit to subtract said averaged video frame from the present video frame thereby to generate a second derivative video signal; and a second adding circuit connected to said storing means and to the output of said subtracting circuit to add the present video frame to said second derivative video signal thereby to generate a video signal in which the definition of the edges of moving objects is enhanced.

6. The apparatus according to claim 5 further comprising a buffer-amplifier connected between the output of said subtracting circuit and said second adding circuit.

7. The apparatus according to claim 5 wherein said storing means is a digital storing means and said apparatus further comprises:

an analogue-to-digital converter interposed between the source of said video signal and the input to said storing means; and a digital clock for receiving synchronizing signals for said video signal, said clock being connected to and synchronizing said analogue-to-digital converter and said digital storing means.

8. The apparatus according to claim 7 wherein said digital storing means comprises first and second digital memories each having a capacity sufficient to store at least one entire video frame, the output of said first digital memory being connected to the input of said second digital memory.

9. Apparatus for enhancing the definition of the edges of moving objects in a video signal, or the like, which comprises:

means for storing at least two complete frames of said video signal to furnish, at any instant of time, information concerning present, past and future video frames;

a first adding circuit connected to the input and output of said storing means thereby to average a past and a future video frame;

a subtracting circuit connected to said storing means and to the output of said adding circuit to subtract said averaged video frame from the present video frame thereby to generate a second derivative video signal;

means, connected to the output of said subtracting circuit, for performing the mathematical operation {SGN ($F$)· MAX (0, $|F| - T$)}, on the output of said subtracting circuit, where $F$ represents the second derivative signal at said output and $T$ is some threshold level above any noise which may be present in said video signal; and a second adding circuit connected to said storing means and to the output of said performing means to add the present video frame to the output of said performing means thereby to generate a video signal in which the definition of the edges of moving objects is enhanced but the noise is not enhanced.

10. The apparatus according to claim 9 further comprising a buffer-amplifier connected between the output of said digital logic circuit and said second adding circuit.

11. The apparatus according to claim 9 wherein said storing means is a digital storing means and said apparatus further comprises:

an analogue-to-digital converter interposed between the source of said video signal and the input to said storing means; and a digital clock for receiving synchronizing signals for said video signal, said clock being connected to and synchronizing said analogue-to-digital converter, said storing means, and said performing means.

12. The apparatus according to claim 11 wherein said digital storing means comprises first and second digital memories each having a capacity sufficient to store at least one entire video frame, the output of said first digital memory being connected to the input of said second digital memory.

13. A pre-emphasis circuit for enhancing the higher temporal frequencies in a video signal, or the like, prior to transmission thereof over a transmission facility, which comprises:

means for storing at least one complete frame of said video signal to furnish, at any instant of time, information concerning both present and future video frames;

a subtractor circuit connected to the input and output of said storing means to subtract the present video frame from a future video frame and thereby generate a first derivative video signal; and an adding circuit connected to the input of said storing means and to the output of said subtractor circuit to add said first derivative video signal to the present video frame, whereby the higher temporal frequencies in said present frame are enhanced.

14. The circuit according to claim 13 wherein said storing means is a digital storing means and said apparatus further comprises:

an analogue-to-digital converter interposed between the source of said video signal and the input to said digital storing means; and a digital clock for receiving synchronizing signals for said video signal, said clock being connected to, and synchronizing, said analogue-to-digital converter and said digital storing means.

15. The circuit according to claim 13 further comprising:

a buffer-amplifier interposed between the output of said subtracting circuit and said adding circuit.

16. A de-emphasis circuit for restoring a video signal, or the like, in which the higher temporal frequencies were enhanced prior to transmission, which comprises:

an adding circuit having an input connected to the source of said video signal;

a first amplifier, having a gain of $1/1 + \alpha$, connected to the output of said adding circuit;

means for storing at least one complete frame of said video signal to furnish, at any instant of time, information concerning present and future video frames, said storing means being connected to the output of said first amplifier; and a feedback loop connecting the output of said storing means to said adding circuit, said feedback loop including a second amplifier having a gain of $\alpha$, with the output of said de-emphasis circuit being taken from the output of said storing means.

17. The apparatus according to claim 16 wherein said storing means is a digital storing means and said apparatus further comprises:

a digital-to-analogue converter connected to the output of said storing means; and a digital clock connected to the input of said adding circuit to receive synchronizing signals for said video signal, said clock being connected to and synchronizing, said digital-to-analogue converter and said storing means.

* * * * *